(12) United States Patent
Fujimori (10) Patent No.: US 12,040,902 B2
(45) Date of Patent: Jul. 16, 2024

(54) COMMUNICATION DEVICE, COMMUNICATION METHOD THEREOF, INFORMATION PROCESSING DEVICE, CONTROL METHOD THEREOF, AND STORAGE MEDIUM

(71) Applicant: CANON KABUSHIKI KAISHA, Tokyo (JP)

(72) Inventor: Yuki Fujimori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 370 days.

(21) Appl. No.: 17/394,676

(22) Filed: Aug. 5, 2021

(65) Prior Publication Data

US 2021/0367714 A1 Nov. 25, 2021

Related U.S. Application Data

(63) Continuation of application No. PCT/JP2020/004215, filed on Feb. 5, 2020.

(30) Foreign Application Priority Data

Feb. 28, 2019 (JP) .................................. 2019-036404

(51) Int. Cl.
*H04L 1/18* (2023.01)
*H04L 1/1812* (2023.01)

(52) U.S. Cl.
CPC .................................. *H04L 1/1812* (2013.01)

(58) Field of Classification Search
CPC ... H04L 1/1812; H04L 1/1896; H04L 1/1614; H04L 1/1835; H04W 28/04; H04W 28/06; H04W 84/12

See application file for complete search history.

(56) References Cited

U.S. PATENT DOCUMENTS

2013/0142076 A1* 6/2013 Ramos ................... H04L 45/02
370/254
2019/0373586 A1* 12/2019 Verma ................... H04W 72/51

FOREIGN PATENT DOCUMENTS

| CN | 1402463 A | 3/2003 |
| CN | 107735994 A | 2/2018 |
| CN | 107888522 A | 4/2018 |

(Continued)

OTHER PUBLICATIONS

International Search Report issued by the Japan Patent Office on Mar. 10, 2020 in corresponding International Application No. PCT/JP2020/004215, with English translation.

(Continued)

*Primary Examiner* — Jamal Javaid
(74) *Attorney, Agent, or Firm* — Carter, DeLuca & Farrell LLP (57) ABSTRACT

A communication device transmits a radio frame including a preamble and a data field of a physical layer (PHY). The preamble includes an L-STF (Legacy Short Training Field), an (Legacy Long Training Field), an L-SIG (Legacy Signal Field), an EHT-SIG-A (Extremely High Throughput Signal A Field), an EHT-STF (EHT Short Training Field), and an EHT-LTF (EHT Long Training Field), and the EHT-SIG-A includes a subfield in which information concerning whether Hybrid Automatic Repeat request (HARQ) is used in transmission of data included in the data field is set.

17 Claims, 5 Drawing Sheets

(56) References Cited

FOREIGN PATENT DOCUMENTS

JP      2003-179581 A    6/2003
JP      2018-050133 A    3/2018

OTHER PUBLICATIONS

Park, E. et al., "Overview of PHY features for EHT" IEEE 802.11-18/1967rl, IEEE, https://mentor.ieee.org/802.11/dcn/18/11-18-1967-01-0eht-overview-of-phy-features-for-eht.pptx (Jan. 14, 2019) pp. 1-22.

Latif, I. et al., "HARQ in EHT" IEEE 802.11-18/2029rl, IEEE, https://mentor.ieee.org/802.11/dcn/18/11-18-2029-01-0eht-harq-in-eht.pptx (Nov. 12, 2018) pp. 1-12.

Office Action issued by the Chinese Patent Office on Oct. 10, 2022 in corresponding CN Patent Application No. 202080016899.X, with English translation.

\* cited by examiner

COMMUNICATION DEVICE, COMMUNICATION METHOD THEREOF, INFORMATION PROCESSING DEVICE, CONTROL METHOD THEREOF, AND STORAGE MEDIUM

CROSS-REFERENCE TO RELATED APPLICATIONS

This application is a Continuation of International Patent Application No. PCT/JP2020/004215, filed. Feb. 5, 2020, which claims the benefit of Japanese Patent Application No. 2019-036404, filed Feb. 28, 2019, both of which are hereby incorporated by reference herein in their entirety.

BACKGROUND OF THE INVENTION

Field of the Invention

The present invention relates to a communication device, a communication method thereof, an information processing device, a control method thereof, and a storage medium and, more particularly, to a communication control technique in a wireless LAN.

Background Art

Along with the increase in data amount to be communicated in recent years, communication techniques such as a wireless LAN (Local Area Network) have been developed. As a major communication standard of the wireless LAN, the IEEE (institute of Electrical and Electronics Engineers) 802.11 standard series is known. The IEEE802.11 standard series includes standards such as IEEE802.11a/b/g/n/ac/ax. For example, in the latest standard, IEEE802.11ax, a technique that uses OFDMA (Orthogonal Frequency-Division Multiple Access) to implement a high peak throughput of up to 9.6 gigabits per second (Gbps) and additionally improve the communication speed under a congestion situation has been standardized (see PTL 1).

On the other hand, in order to further improve throughput, a study group called IEEE802.11EHT (Extremely High Throughput) has been firmed as a successor standard of IEEE802.11ax. In the EHT, application of the HARQ (Hybrid Automatic Repeat reQuest) with soft combining technique between an access point (AP) and a station (STA) has been examined. When the HARQ with soft combining is used, efficient data transmission is possible as compared to a case in which conventional ARQ (Automatic Repeat reQuest) is used.

CITATION LIST

Patent Literature

PTL 1: Japanese Patent Laid-Open No. 2018-050133

It is useful that a communication device that has received a radio frame quickly confirms whether HARQ is used in the data transmission by the radio frame. On the other hand, since HARQ is not used the conventional standard, there exists no mechanism configured to cause the communication device to recognize whether HARQ is used in the data transmission by the radio frame.

SUMMARY OF THE INVENTION

The present invention provides a technique of, when a communication device receives a radio frame, allowing the communication device to quickly recognize whether HARQ is used in data transmission by the radio frame.

According to one aspect of the present invention, there is provided a communication device that transmits a radio frame including a preamble and a data field of a physical layer (PHY), wherein the preamble includes an L-STF (Legacy Short Training Field), an L-LTF (Legacy Long Training Field), an L-SIG (Legacy Signal Field), an EHT-SIG-A (Extremely High Throughput Signal A Field), an EHT-STF (EUT Short Training Field), and an EHT-LTF (EHT Long Training Field), and the EHT-SIG-A includes a subfield in which information concerning whether Hybrid Automatic Repeat request (HARQ) is used in transmission of data included in the data field is set.

Further features of the present invention will become apparent from the following description of exemplary embodiments with reference to the attached drawings.

DESCRIPTION OF THE EMBODIMENTS

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

(Network Configuration)

Figure 1:
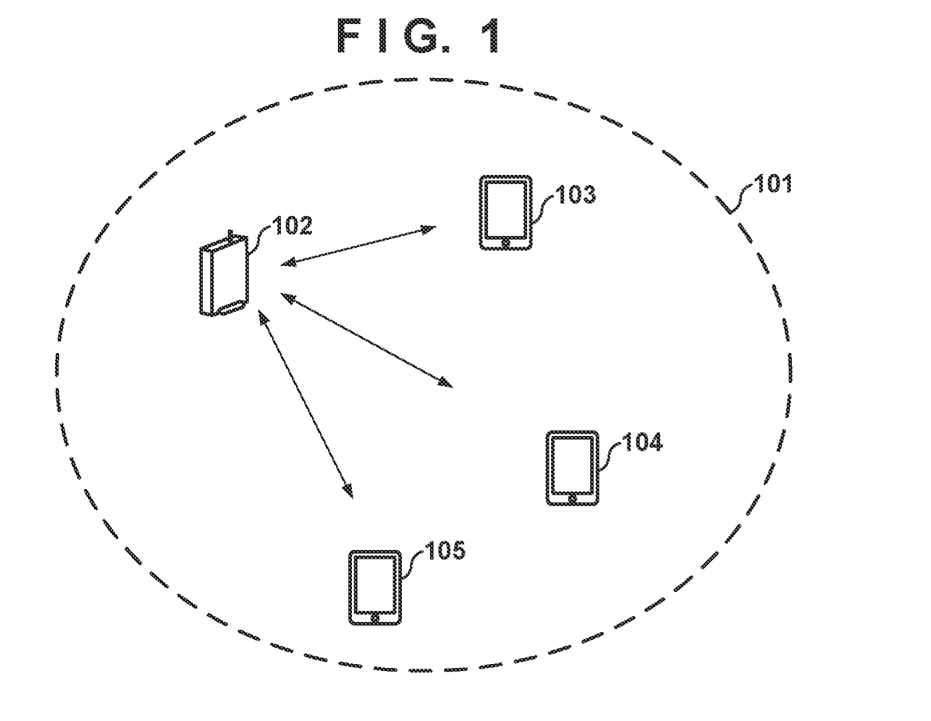
FIG. 1 is a view showing an example of the configuration of a network.

FIG. 1 shows an example of the configuration of a wireless communication network according to this embodiment. This wireless communication network includes one access point (AP) and three stations (STAs). Here, each of an AP 102 and STAs 103 to 105 complies with IEEE802.11EHT (Extremely High Throughput), and is configured to be capable of performing wireless communication complying with standards defined before the IEEE802.11EHT standard. Note that the name "IEEE802.11EHT" is provided for convenience, and can be another name when the standard was established, but this specification and the appended claims are to cover all the standards that can support the processing to be described later. In the following description, in a case in which a specific device is not referred to or the like, the access point may be referred to as "AP" and the station (terminal) may be referred to as "STA" without reference numerals. Note that in FIG. 1, the wireless communication network including one AP and three STAs is shown as an example, but the numbers of these communication devices may be more or less than shown. In an example, no AP may exist when the STAs communicate with each other. In FIG. 1, the communicable area of the network formed by the AP 102 is indicated by a circle 101. Note that this communicable area may cover a larger area, or may cover only a smaller area. Note that it may be understood that EHT is an acronym of Extreme High Throughput.

(Configuration of Device)

Figure 2:
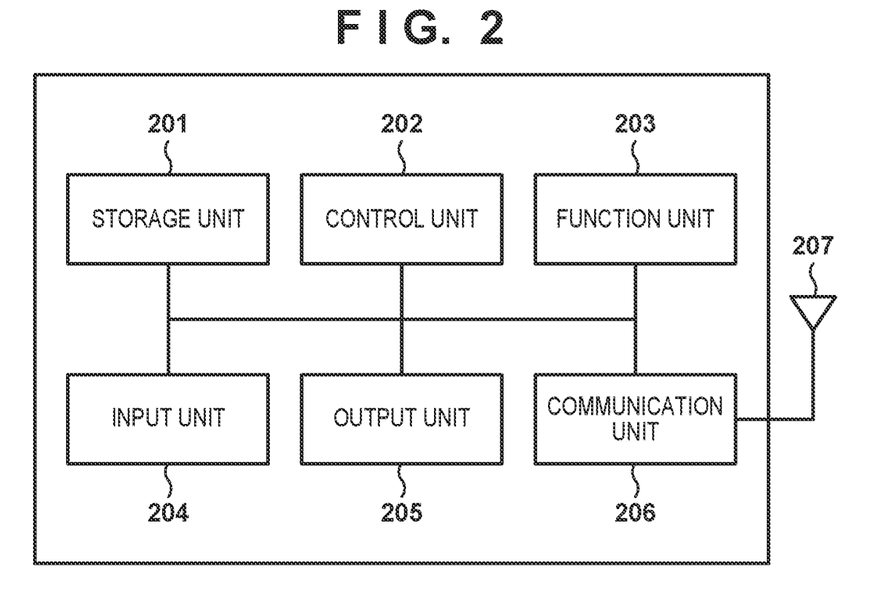
FIG. 2 is a block diagram showing an example of the functional configuration of a communication device.

FIG. 2 shows an example of the hardware configuration of each of the communication devices (AP and STAs). The communication device includes, as an example of its hardware configuration, a storage unit 201, a control unit 202, a function unit 203, an input unit 204, an output unit 205, a communication unit 206, and an antenna 207.

The storage unit 201 is formed by both of a ROM and a RAM or one of them, and stores programs for performing various kinds of operations to be described later and various kinds of information such as communication parameters for wireless communication. Note that other than the memories such as a ROM and a RAM, a storage medium such as a flexible disk, a hard disk, an optical disk, a magnetooptical disk, a CD-ROM, a CD-R, a magnetic tape, a nonvolatile memory card, or a DVD may be used as the storage unit 201.

The control unit 202 is formed by, for example, one or more processors such as a CPU and an MPU, an ASIC (Application Specific Integrated Circuit), a DSP (Digital Signal Processor), an FPGA (Field Programmable Gate Array), or the like. Here, CPU is an acronym of Central Processing Unit, and MPU is an acronym of Micro Processing Unit. The control unit 202 executes the programs stored in the storage unit 201, thereby controlling the entire device. Note that the control unit 202 may control the entire device by cooperation of the programs stored in the storage unit 201 and an OS (Operating System).

In addition, the control unit 202 controls the function unit 203 to execute predetermined processing such as image capturing, printing, or projection. The function unit 203 is hardware used by the device to execute predetermined processing. For example, if the device is a camera, the function unit 203 is an image capturing unit and performs image capturing processing. For example, if the device is a printer, the function unit 203 is a printing unit and performs print processing. For example, if the device is a projector, the function unit 203 is a projection unit and performs projection processing. Data to be processed by the function unit 203 may be data stored in the storage unit 201, or may be data communicated with another AP or STA via the communication unit 206 to be described later.

The input unit 204 accepts various kinds of operations from a user. The output unit 205 performs various kinds of outputs for the user. Here, the output by the output unit 205 includes, for example, at least one of display on a screen, audio output by a loudspeaker, vibration output, and the like. Note that both the input unit 204 and the output unit 205 may be implemented by one module, like a touch panel.

The communication unit 206 controls wireless communication complying with the IEEE802.11 standard series, or controls IP communication. The communication unit 306 is a so-called radio chip, and may itself include one or more processors and memories. In this embodiment, the communication unit 206 can execute processing complying with at least the IEEE802.11ax standard. In addition, the communication unit 206 controls the antenna 207 to transmit and receive radio signals for wireless communication. The device communicates contents such as image data, document data, or video data with another communication device via the communication unit 206. The antenna 207 is an antenna that can transmit and receive signals in at least any one of, for example, a sub-GHz band, 2.4 GHz band, 5 GHz band, and 6 GHz band. Note that the frequency band (and a combination of frequency bands) to which the antenna 207 is adaptable is not particularly limited. The antenna 207 may be one antenna, or may be a set of two or more antennas to perform MIMO (Multi-Input and Multi-Output) transmission/reception. FIG. 2 shows one antenna 207, but the antenna may include two or more antennas (two or more sets of antennas) that are adaptable to different frequency bands.

Figure 3:
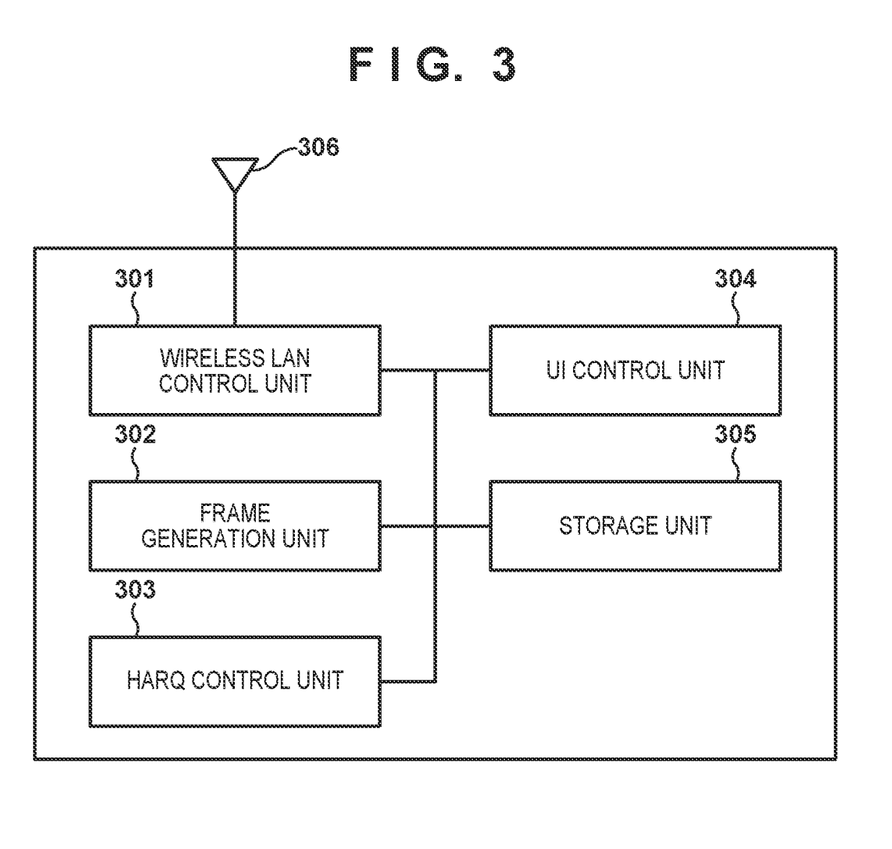
FIG. 3 is a block diagram showing an example of the hardware configuration of the communication device.

FIG. 3 shows an example of the functional configuration of each of the communication devices (AP and STAs). As an example, the communication device includes a wireless LAN control unit 301, a frame generation unit 302, a HARQ control unit 303, a IA control unit 304, a storage unit 305, and an antenna 306.

The wireless LAN control unit 301 is configured to include circuits that transmit/receive radio signals to/from another wireless LAN device (for example, another AP or STA) using the antenna 306, and programs configured to control these. The wireless LAN control unit 301 executes communication control of wireless LAN such as transmission of a frame generated by the frame generation unit 302 and reception of a radio frame from another wireless LAN device in accordance with the IEEE802.11 standard series. The frame generation unit 302 generates a radio frame including data to be transmitted to, for example, another AP or STA. At this time, the frame generation unit 302 generates the radio frame based on control of the HARQ control unit 303, The HARQ control unit 303 performs generation of an error correction code for transmission data, control of an error correction code version to be transmitted when executing retransmission, and the like in accordance with the type of HARQ (Hybrid Automatic Repeat reQuest) to be used. Also, the HARQ control unit 303 performs error correction decoding by an error correction code for reception data in accordance with the type of HARQ to be used. Furthermore, if an error included in the reception data cannot completely be corrected, the HARQ control unit 303 stores the data including the error in a reception buffer held by the HARQ control unit 303. Then, the HARQ control unit 303 performs error correction decoding using reception data included in a packet retransmitted after that and the reception data stored in the reception buffer, thereby efficiently executing error correction. Types of HARQ include, for example, Chase Combining and Incremental Redundancy. Types of HARQ may also include, for example, Partial Chase Combining, Partial Incremental Redundancy, and the like. These are merely examples, and other HARQ types may be used. The UI control unit 304 is configured to include hardware concerning user interfaces (UIs) such as a touch panel and buttons configured to accept an operation on the communication device by the user (not shown) of the communication device, and programs configured to control these. Note that the UI control unit 304 also has a function of, for example, presenting information to the user, such as display of an image or the like or audio output. The storage unit 305 is configured to include a storage device such as a ROM (Read Only Memory) or a RAM (Random Access Memory) configured to store programs to be executed by the communication device and various kinds of data.

In this embodiment, if the communication device is a transmission device, and transmission data is transmitted using HARQ, the frame generation unit 302 generates a radio frame including a PHY (physical layer) preamble representing that HARQ is used. If the communication device is a reception device, the communication device decodes the PHY preamble upon receiving a radio frame, thereby specifying whether HARQ is used. Hence, for example, the communication device can activate the HARQ control unit 303 in accordance with reception of a radio frame using HARQ, and as a result, it is possible to suppress waste of power consumption of the communication device. Also, for example, in a communication device including a plurality of communication processing units configured to concurrently process data, a series of data transmitted using HARQ can be distributed to a first communication processing unit, and data transmitted without using HARQ can be distributed to a second communication processing unit. At this time, the data distribution destination can quickly be distributed when decoding of a physical header is completed. It is therefore possible to efficiently execute concurrent processing of data.

(Procedure of Processing)

Figure 4:
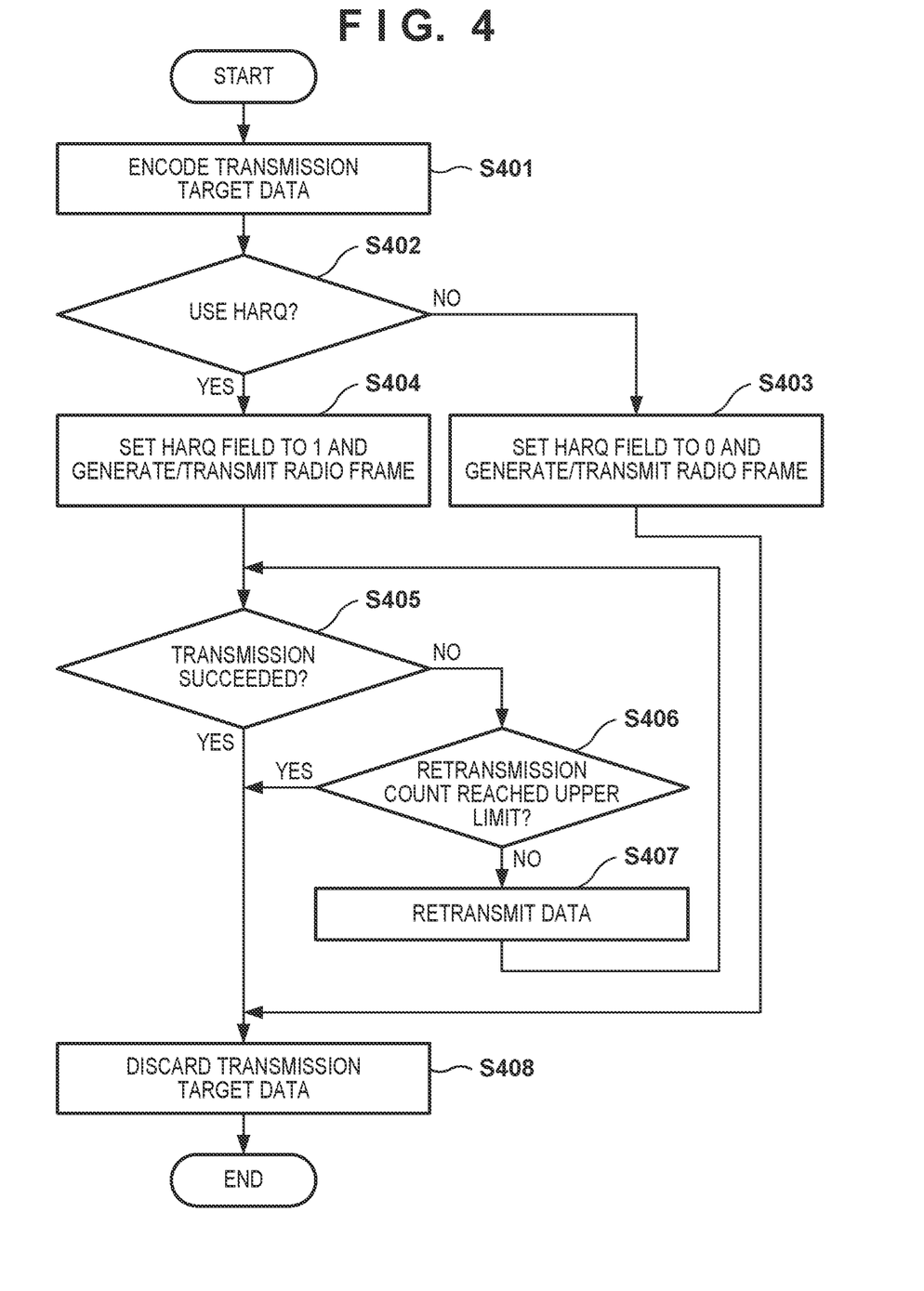
FIG. 4 is a flowchart showing an example of the procedure of radio frame transmission processing.
Figure 5:
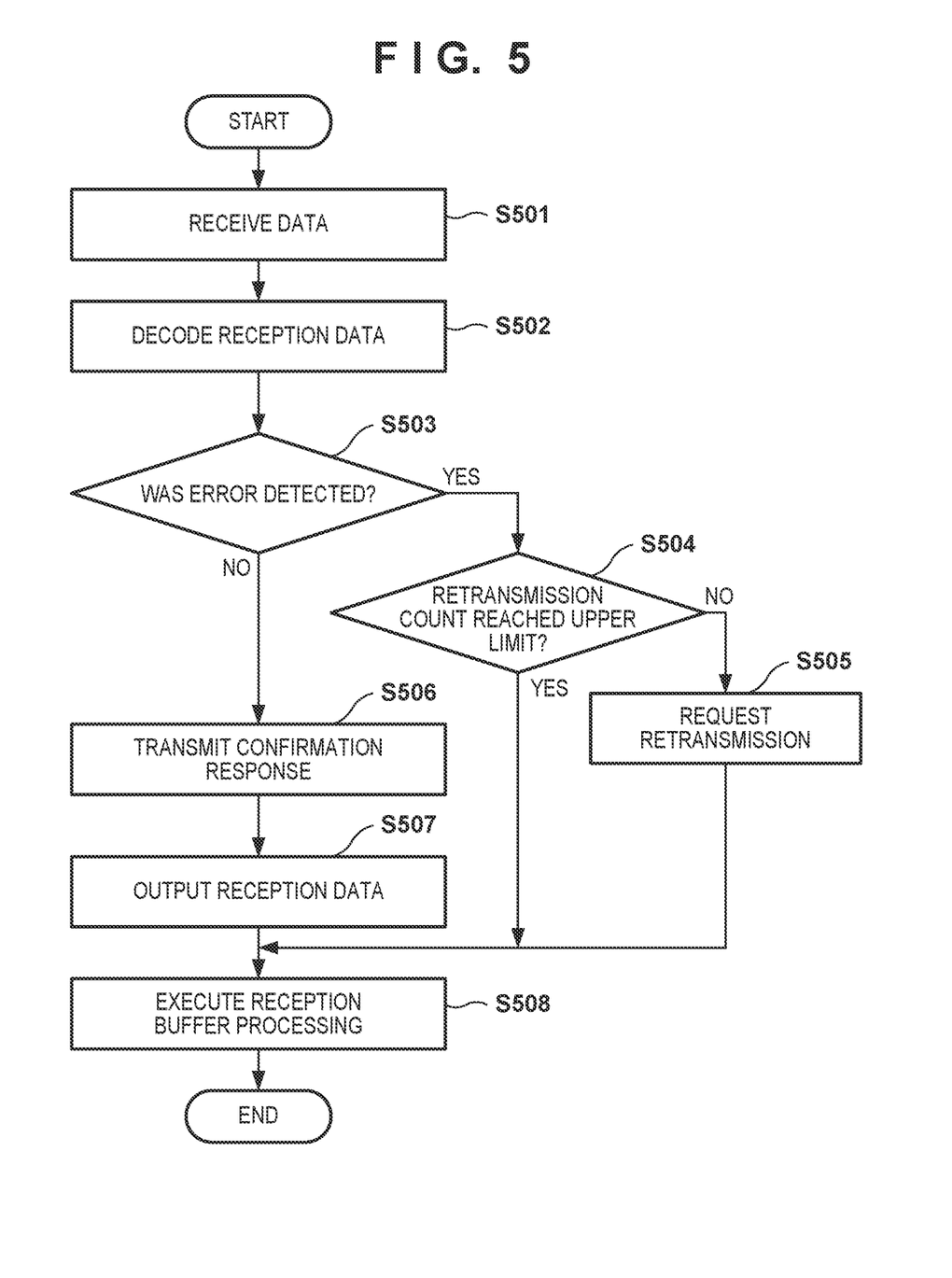
FIG. 5 is a flowchart showing an example of the procedure of radio frame reception processing.

The procedure of processing to be executed by the communication device will be described next. Note that before the processing to be described below is performed, connection is established by processing defined by the IEEE802.11 standard between a communication device (to be referred to as a transmitting device hereinafter) on the transmitting side and a communication device (to be referred to as a receiving device hereinafter) on the receiving side. Also, to simplify the description, processing according to whether HARQ is used will be described here, and a description of ARQ that can be used independently of the HARQ will be omitted. FIG. 4 shows an example of the procedure of processing to be executed by the transmitting device, and FIG. 5 shows an example of the procedure of processing to be executed by the receiving device.

Based on completion of preparation of transmission target data, the transmitting device starts processing shown in FIG. 4 and encodes the transmission target data (step S401). Here, encoding using both an error detection code and an error correction code is performed for the transmission target data. As an example, the error detection code can be a cyclic redundancy check (CRC) code but is not limited to this. As an example, the error correction code can be a binary convolutional code, a low density parity check code, a turbo code, or the like but is not limited to these. Note that an error correction code to which both the transmitting device and the receiving device are adaptable is used.

Then, the transmitting device performs processing of generating a radio frame including the transmission target data after encoding. At this time, the transmitting device determines whether to use HARQ (step S402). Upon determining not to use HARQ (NO in step S402), the transmitting device generates a radio frame including a PHY preamble representing that HARQ is not used and transmits it (step S403). At this time, if ARQ is not used, either, the transmitting device discards the transmission target data (step S408). Note that if ARQ is performed, the transmission target data is not discarded but held (for example, in the storage unit 305) to prepare for retransmission, and is discarded after the processes of steps S405 to S407 to be described later.

On the other hand, upon determining to use HARQ (YES in step S402), the transmitting device generates a radio frame including a PITY preamble representing that HARQ is used and transmits it (step S404). At this time, the transmitting device holds the transmission target data (for example, in the storage unit 305) without discarding to prepare for retransmission. The transmitting device then determines whether the data transmission has succeeded (step S405). If ACK is received from the receiving device within, for example, a predetermined time (AckTimeout defined by the IEEE802.11 standard), the transmitting device determines that the data transmission has succeeded. Upon determining that the data transmission has succeeded (YES in step S405), the transmitting device discards the held transmission target data after the transmission (step S408). Note that the transmitting device resets the retransmission count to 0 at this time. The transmitting device may determine, by, for example, block ACK, whether the data transmission has succeeded. In this case, the transmitting device can confirm, using Block Ack Starting Sequence Control and Block Ack Bitmap included in Block ACK, whether transmission of the transmission target data has succeeded. Note that if the above-described ACK or Block ACK is not received within a predetermined time, the transmitting device determines that data transmission has failed.

Upon determining that data transmission has failed (NO in step S405), next, the transmitting device determines whether the current retransmission count has reached an upper limit value (dot11ShortRetryLimit defined by the IEEE102.11 standard) (step S406). Note that the current retransmission count is held for each transmission target data and, setting the initial value to 0, incremented by only one every time data retransmission is performed. Upon determining that the retransmission count of the transmission target data has not reached the upper limit value (NO in step S406), the transmitting device retransmits the transmission target data (step S407). Note that in the retransmission, an appropriate version of the encoded data generated in step S401 is transmitted. For example, in Chase Combining type HARQ, the same transmission target data is transmitted every time. In Incremental Redundancy type, encoded data of a different version is transmitted every time. After that, the transmitting device returns the process to step S405 to repeat retransmission of the transmission target data as needed. Note that if the retransmission count has reached the upper limit value (YES in step S406), the transmitting device discards the transmission target data (step S408) and ends the processing.

Upon receiving a radio frame (data) from the transmitting device (step S501), the receiving device executes data decoding processing concerning the reception data (step S502), Note that the receiving device decodes the NW preamble of the radio frame, thereby determining whether the radio frame is adaptable to HARQ. Based on the reception of the radio frame representing that HARQ is used, the receiving device executes processing from step S503. On the other hand, upon receiving a radio frame representing that HARQ is not used, the receiving device can request, for example, retransmission of ARQ in accordance with detection of an error in the radio frame, but discards the received radio frame. The receiving device executes decoding processing using a decoding algorithm corresponding to the error correction code and executes error detection using a detection algorithm corresponding to the error detection code. Note that for retransmission data in a case in which HARQ is used, the receiving device performs decoding processing based on (for example, by combining) data including an error and held in a reception buffer and newly received data. This makes it possible to efficiently execute error correction processing.

The receiving device determines whether an error is detected in the result of decoding the reception data (step S503). If an error is detected (YES in step S503), the receiving device determines whether the current retransmission count has reached the upper limit value (step S504). If the retransmission count has not reached the upper limit value (NO in step S504), the receiving device requests the transmitting device to do retransmission (step S505) and executes reception buffer processing to be described later for the received packet (step S508). Note that the receiving device executes the processing from step S501 again in accordance with reception of retransmission data according to the retransmission request. Note that the retransmission request is performed when, for example, ACK is not received during the AckTimeout time defined by the IEEE802.11 standard. That is, the receiving device can implicitly request retransmission by refraining from taking an action for the transmitting device. In addition, the receiving device may explicitly transmit a retransmission request to the transmitting device using Block ACK or another signal. If Block ACK is used, the receiving device can notify the transmitting device of a reception failure by setting a bit corresponding to the sequence number of a packet in which an error is detected to 0 in Block ACK Bitmap. Also, the receiving device may transmit a NAK frame as a retransmission request packet. After that, the receiving device executes reception buffer processing to be described later (step S508) and ends the processing.

On the other hand, if no error is detected in the result of decoding the reception data (NO in step S503), the receiving device transmits a confirmation response frame such as ACK or Block ACK to the transmitting device (step S506). If Block ACK is used, the receiving device notifies the transmitting device of a packet whose reception has succeeded using Block ACK Bitmap corresponding to the sequence number of the packet. Fax example, the receiving device can notify the transmitting device that data reception has succeeded by setting a bit corresponding to the sequence number of a packet in which no error is detected to 1 in Block ACK Bitmap. After that or concurrently with step S506, the receiving device outputs the reception data to a program configured to control upper layers above a MAC (Medium Access Control) layer (step S507). Also, after that or concurrently with step S506 or S507, the receiving device executes the above-described reception buffer processing (step S508) and ends the processing.

In the reception buffer processing, the receiving device holds an error packet in which an error is detected as primary data in the reception buffer (for example, in the storage unit 305). On the other hand, if no error is detected, or if the retransmission count reaches the upper limit, and retransmission is not performed anymore, the receiving device discards the primary data held in the reception buffer in the reception buffer processing.

(Frame Structure)

Figure 6:
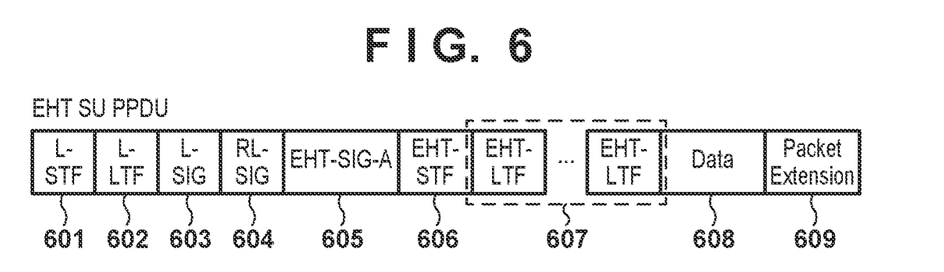
FIG. 6 is a view showing an example of the PHY frame structure of an EHT SU PPDU.
Figure 7:
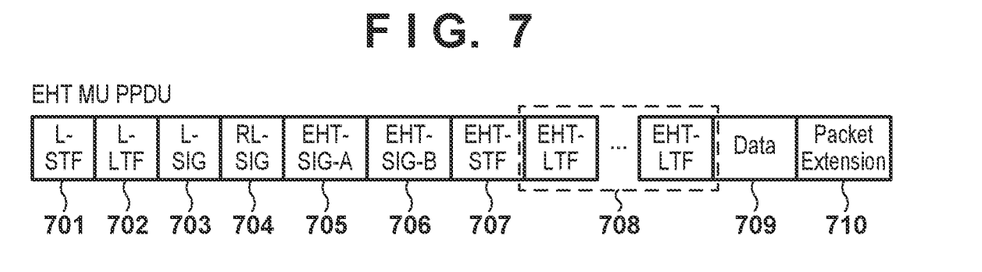
FIG. 7 is a view showing an example of the PHY frame structure of an EHT MU PPDU.
Figure 8:
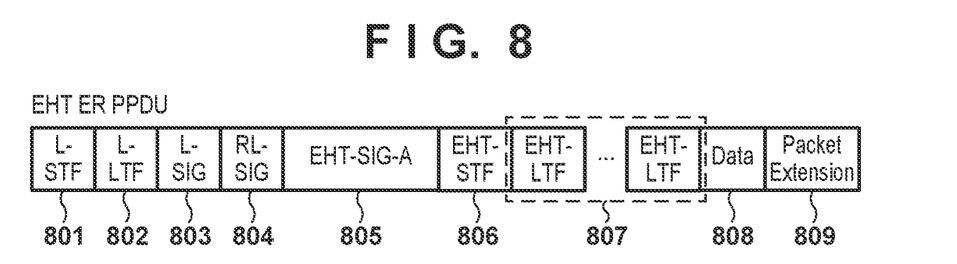
FIG. 8 is a view showing an example of the PHY frame structure of an EHT ER PPDU.

Each of FIGS. 6 to 8 shows an example of a radio frame (PPDU) (Physical Layer (PITY) Protocol Data Unit) defined by the IEEE802.11EHT standard and transmitted received in the processes shown in FIGS. 4 and 5. FIG. 6 shows an example of an EHT SU (Single User) PPDU that is a PPDU for single-user communication, and FIG. 7 shows an example of an EHT MU (Multi User) PPDU for multi-user communication. FIG. 8 shows an example of an EHT ER (Extended Range) PPDU for long distance transmission. The EHT ER PPDU is used when the communication area should be extended in communication between an AP and a single STA.

The PPDU includes fields including an STF Short Training Field), an LTF (Long Training Field), and a SIG (Signal Field). As shown in FIG. 6, the PPDU head portion includes an L (Legacy)-STF 601, an L-LTF 602, and an L-SIG 603 for ensuring backward compatibility with the IEEE802.11a/b/g/n/ax standards. Note that each of frame formats shown in FIGS. 7 and 8 includes an L-STF (L-STF 701 or 801), an L-LTF (L-LTF 702 or 802), and an L-SIG (L-SIG 703 or 803). Note that the L-LTF is arranged immediately after the L-STF, and the L-SIG is arranged immediately after the L-LTF. Note that each of the structures shown in FIGS. 6 to 8 further includes an RI-SIG (Repeated L-SIG RL-SIG 604, 704, or 804) arranged immediately after the L-SIG In the RL-SIG field, the contents of the L-SIG are repeatedly transmitted. The RL-SIG is used to enable a receiver to recognize that this PPDU complies with a standard after the IEEE802.11 ax standard, and may be omitted in IEEE802.11EHT in some cases. In addition, a field for enabling the receiver to recognize that this PPDU complies with the IEEE802.11EHT may be provided in place of the RL-SIG.

The L-STF 601 is used for detection of a PHY frame AGC (Automatic Gain Control), timing detection, or the like. The L-LTF 602 is used for highly accurate frequency/time synchronization, obtainment of propagation channel information (CSI: Channel State information), or the like. The L-SIG 603 is used fix transmitting control information including information such as a data transmission rate and a PRY frame length. A legacy device complying with the IEEE802.11a/b/g/n/ax standards can decode the above-described various kinds of legacy fields.

Each PPDU further includes an more EHT-SIG (EHT-SIG-A 605, EHT-SIG-A 705, EHT-SIG-B 706, or EHT-SIG-A 805) arranged immediately after the RL-SIG and used for transmitting control information for EHT. Each PPDU further includes an STF for EHT (EHT-STF 606, 707, or 806) and an LTF for EHT (EHT-LTF 607, 708, or 807). Each PPDU includes, after these controlling fields, a data field 608, 709, or 808 and a Packet extension field 609, 710, or 809. The portion including the fields from the L-STF to the EHT-LTF of each PPDU is referred to as a PHY preamble. Note that the respective fields of each PPDU may not necessarily be arranged in the order shown in each of FIGS. 6 to 8, or may include a new field not shown in each of FIGS. 6 to 8.

Note that each of FIGS. 6 to 8 shows the PPDU that can ensure the backward compatibility as an example. However, if it is unnecessary to ensure the backward compatibility, for example, the legacy fields may be omitted. In this case, for example, the EHT-STF and EHT-LTF are used in place of the L-STF and the L-LTF to establish synchronization. Then, the EHT-STF and one of the plurality of EHT-LTFs after the EHT-SIG field can be omitted.

The EHT-SIG-A 605 and 805 included in the EHT SU PPDU and the EHT ER PPDU include an EHT-SIG-A1 and an EHT-SIG-A2 necessary for reception of the PPDU, respectively, as shown in Tables 1 and 2 below. In this embodiment, a HARQ subfield representing whether HARQ is used in transmission of data included in the data field of the PPDU is included in the EHT-SIG-A1. Also, the EHT-SIG-A 705 of the EHT MU PPDU shown in FIG. 7 includes an EHT-SIG-A1 and an EHT-SIG-A2 necessary for reception of the PPDU as shown in Tables 3 and 4 below. In this embodiment, a HARQ subfield as described above is included in the EHT-SIG-A2. For example, when HARQ is used, 1 is set in the HARQ subfield. When HARQ is not used, 0 is set in the HARQ subfield. However, this is merely an example. To the contrary, 0 may be set in the HARQ subfield when HARQ is used, and 1 may be set in the HARQ subfield when HARQ is not used. Note that the configurations of Tables 1 to 4 are merely examples and, for example, in the EHT SU PPDU and the EHT ER PPDU, the information of HARQ may be notified at a position other than the 15th bit of the EHT-SIG-A1 field. Similarly, in the EHT MU PPDU, the information of HARQ may be notified at a position other than the eighth bit of the EHT-SIG-A2 field. The names and contents of the fields may be different from those shown in Tables 1 to 4.

TABLE 1

| | Bit Position | Subfield | Bit Count | Description |
|---|---|---|---|---|
| EHT-SIG-A1 | B0 | Format | 1 | "1" is set for an EHT PPDU and an EHT ER PPDU to distinguish them from an EHT TB PPDU. |
| | B1 | Beam Change | 1 | "1" is set if the pre-EHT of the PPDU is arranged in a space different from the first symbol of the EHT-LTF, or "0" is set if the pre-EHT is mapped similarly to the first symbol. |
| | B2 | UL/DL | 1 | This subfield indicates whether the PPDU is for UL or DL, and has the same value as TXVECTOR UPLINK_FLAG |
| | B3-B6 | MCS | 4 | This subfield indicates the value of the Modulation and Coding Scheme. In a case of an EHT SU PPDU, n = 0, 1, 2, . . . , 11 (12 to 15 are reserved). In a case of an EHT ER SU PPDU and Bandwidth = 0, n = 0, 1, 2 (3 to 15 are reserved areas). In a case of an EHT ER SU PPDU and Bandwidth = 1, n = 0 for MCS 0 (1 to 15 are reserved areas). |
| | B7 | DCM | 1 | This subfield indicates whether Dual Carrier Modulation is applied to the data field. If "0" is set in the STBC field, "1" is set. (If both the DCM and STBC fields are "1", neither of them is applied) If DCM is not applied, "0" is set. |
| | B8-B13 | BSS Color | 6 | 6-bit number for identifying the BSS |
| | B14 | HARQ | 1 | "1" is set if HARQ is used. "0" is set if HARQ is not used. |
| | B15-B18 | Spatial Reuse | 4 | This subfield indicates whether Spatial Reuse is allowed during transmission of this PPDU. The value of Spatial Reuse field encoding shown in the separate table is set. |
| | B19-B20 | Bandwidth | 2 | In a case of an EHT SU PPDU: "0" is set for 20 MHz, "1" is set for 40 MHz, "2" is set for 80 MHz, or "3" is set for 160 MHz (80 + 80 MHz). In a case of an EHT ER SU PPDU: "0" is set for 242-tone RU, or "1" is set for upper 106-tone RU of 20 MHz. |
| | B21-B22 | GI + LTF Size | 2 | This subfield indicates the Guard Interval period and the EHT-LTF size. "0" is set for 1 × EHT-LTF and 0.8 μs GI, "1" is set for 2 × EHT-LTF and 0.8 μs GI, "2" is set for 2 × EHT-LTF and 1.6 μs GI, "3" is set if both the DCM and STBC fields are "1" and for 4 × EHT-LTF and 0.8 μs GI, or "3" is set for 4 × EHT-LTF other than the above case and 3.2 μs GI. |
| | B23-B25 | NSTS And Midamble Periodicity | 2 | This subfield indicates the number of space-time streams and the midamble period for frame synchronization. If the Doppler field is "0", "(the number of |

TABLE 1-continued

| Bit Position | Subfield | Bit Count | Description |
|---|---|---|---|
| | | | space-time streams)- 1" is set. If the Doppler field is "1", B23 and B24 indicate the number of space-time streams. B25 is "0" if the midamble period is 10, or "1" if the midamble period is 20. |

TABLE 2

| Bit Position | Subfield | Bit Count | Description |
|---|---|---|---|
| EHT-SIG-A2 B0-B6 | TXOP | 1 | Transmission Opportunity. If TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION − 512)/8 is set in B1 to B6. |
| B7 | Coding | 1 | "0" is set for BCC (Binary Convolutional Code), or "1" is set for LDPC (Low Density Parity Check). |
| B8 | LDPC Extra Symbol Segment | 1 | This subfield indicates the presence/absence of an extra OFDM symbol segment for LDPC. |
| B9 | STBC | 1 | "1" is set in this field if STBC (Space-Time Block Coding) is used and the DCM subfield is "0", "1" is also set if neither DCM nor STBC is applied, or "0" is set otherwise. |
| B10 | Beamformed | 1 | "1" is set if beamforming steering is applied to the waveform of SU transmission. |
| B11-B12 | Pre-FEC Padding Factor | 2 | "0" is set if the Pre-FEC Padding Factor is 4, "1" is set if the Pre-ITC Padding Factor is 1. "2" is set if the Pre-FEC Padding Factor is 2, or "3" is set if the Pre-FEC Padding Factor is 3. |
| B13 | PE Disambiguity | 1 | Disambiguity field of Packet Extension |
| B14 | Reserved | 1 | Reserved field |
| B15 | Doppler | 1 | "1" is set if either of the following conditions is met: the number of OFDM symbols in the data field is larger than "the value indicated by the midamble period + 1", and a midamble exists, and the number of OFDM symbols in the data field is equal to or smaller than "the value indicated by the midamble period + 1", no midamble exists, and the channel changes rapidly. |
| B16-B19 | CRC | 4 | The CRC of the EHT-SIG-A (26 bits of A1 and 16 bits up to B15 of A2, that is, 42 bits in total) field up to here. |
| B20-B25 | Tail | 6 | An area to set "0" to indicate the end portion to a trellis convolution decoder. |

TABLE 3

| | Bit Position | Subfield | Bit Count | Description |
|---|---|---|---|---|
| EHT-SIG-A1 | B0 | UL/DL | 1 | This subfield indicates whether the PPDU is for UL or DL, and has the same value as TXVECTOR UPLINK_FLAG |
| | B1-B3 | SIGB MCS | 3 | This subfield indicates the MCS of the EHT-SIG-B field. "0" is set for MCS 0, "1" is set for MCS 1, "2" is set for MCS 2, "3" is set for MCS 3, "4" is set for MCS 4, or "5" is set for MCS 5. "6" and "7" are reserved areas. |
| | B4 | SIGB DCM | 1 | "1" is set if the HT-SIG-B field is modulated using DCM. |
| | B5-B10 | BSS Color | 6 | 6-bit number for identifying the BSS |
| | B11-B14 | Spatial Reuse | 4 | This subfield indicates whether Spatial Reuse is allowed during transmission of this PPDU. The value of Spatial Reuse field encoding shown in the separate table is set. |
| | B15-B17 | Bandwidth | 3 | "0" is set for 20 MHz, "1" is set for 40 MHz, or "3" is set for 160 MHz (80 + 80 MHz).<br>When the SIGB Compression field is "0",<br>"4" is set if only the secondary 20 MHz is puncturing in 80 MHz preamble puncturing,<br>"5" is set if two 20 MHz of the secondary 40 MHz are puncturing in 80 MHz preamble puncturing,<br>"6" is set if only the secondary 20 MHz is puncturing in 160 (or 80 + 80) MHz preamble puncturing, or<br>"7" is set if only the secondary 40 MHz is puncturing in 160 (or 80 + 80) MHz preamble puncturing.<br>If the SIGB field is "1", the value between "4" to "7" means "reserved". |
| | B18-B21 | Number of EHT-SIG-B Symbols or MU-MIMO Users | 4 | When the SIGB Compression field is "0", this subfield indicates the number of OFDMA symbols in the EHT-SIG-B. If the number of OFDM symbols in the EHT-SIG-B is smaller than 16, the number obtained by subtracting 1 from the number of OFDM symbols in the EHT-SIG-B is set. If at least one receiving terminal has set the capability of supporting the number of EHT SIG-B OFDM symbols larger than 16 to "0", "15" is set to indicate that the nuniber of OFDM symbols in the EHT-SIG-B is 16. If all the receiving terminals have set the capability of supporting the number of EHT SIG-B OFDM symbols larger than 16 to "0" and the data rate of the EHT-SIG-B is smaller than MCS 4 which does not use DCM, "15" is set to indicate that the number of OFDM symbols in the EHT-SIG-B is equal to or larger than 16. When the SIGB Compression field is "1", the value set here means the number obtained by subtracting 1 from the number of MU-MIMO users. |
| | B22 | SIG Compression | 1 | "1" is set if a Common field exists in the EHT-SIG-B. |
| | B23-B24 | GI + LTF Size | 2 | This subfield indicates the Guard Interval period and the EHT-LTF size.<br>"0" is set for 4 × EHT-LTF and 0.8 μs GI, "1" is set for 2 × EHT-LTF and 0.8 μs GI, "2" is set for 2 × EHT-LTF and 1.6 μs GI, or "3" is for 4 × EHT-LTF and 3.2 μs GI. |
| | B25 | Doppler | 1 | "1" is set if either of the following conditions is met:<br>the number of OFDM symbols in the data field is larger than "the value indicated by the midamble period + 1", and a midamble exists, and |

TABLE 3-continued

| Bit Position | Subfield | Bit Count | Description |
| --- | --- | --- | --- |
| | | | the number of OFDM sythbois in the data field is equal to or smaller than "the value indicated by the midamble period + 1", no midamble exists, and the channel changes rapidly. |

TABLE 4

| | Bit Position | Subfield | Bit Count | Description |
| --- | --- | --- | --- | --- |
| EHT-SIG-A2 | B0-B6 | TXOP | 1 | Transmission Opportunity if TXOP_DURATION of TXVECTOR is UNSPECIFIED and there is no period information, 127 is set. If TXOP_DURATION of TXVECTOR is smaller than 512, a value smaller than 127 is set to set NAV. At this time, if B0 is "0", FLOOR of TXOP_DURATION/8 (round down) is set in B1 to B6. If B0 is "1", FLOOR of (TXOP_DURATION − 512)/8 is set in B1 to B6. |
| | B7 | HARQ | 1 | "1" is set if HARQ is used. "0" is set if HARQ is not used. |
| | B8-B10 | Number of EHT-LTF Symbols And Midamble Periodicity | 3 | This subfield indicates the number of EHT-LTFs. "0" is set for one EHT-LTF, "1" is set for two EHT-LTFs, "2" is set for four EHT-LTFs, "3" is set for six EHT-LTFs, or "4" is set for eight EHT-LTFs. When the Doppler field is "1", B8 and B9 indicate the number of EHT-LTF symbols, and B10 indicates the midamble period. |
| | B11 | LDPC Extra Symbol Segment | 1 | This subfield indicates the presencelabsence of an extra OFDM symbol segment for LDPC. |
| | B12 | STBC | 1 | When the number of users of each RU (Resource Unit) is not larger than 1, "1" is set to indicate that STBC is used for encoding. |
| | B13-B14 | Pre-FEC Padding Factor | 2 | "0" is set if the Pre-FEC Padding Factor is 4, "1" is set if the Pre-FEC Padding Factor is 1, "2" is set if the Pre-FEC Padding Factor is 2, or "3" is set if the Pre-FEC Padding Factor is 3. |
| | B15 | PE Disambiguily | 1 | Disainbiguity field of Packet Extension |
| | B16-B19 | CRC | 4 | The CRC of the EHT-SIG-A (26 bits of A1 and 16 bits up to B15 of A2, that is, 42 bits in total) field up to here. |
| | B20-B25 | Tail | 6 | An area to set "0" to indicate the end portion to a trellis convolution decoder. |

Note that the EHT-SIG-B 706 of the EHT MU PPDU includes the information of Common field as shown in Table 5 and the information of User Block field as shown in Table 6, which are necessary for reception of the PPDU.

TABLE 5

|  | Subfield | Bit Count | Description |
|---|---|---|---|
| Common field | RU Allocation | N × 8 | This sub-field indicates RU allocation used in the data portion of a frequency axis<br>When N = 1, EHT MU PPDUs of 20 MHz and 40 MHz are allocated.<br>When N = 2, an EHT MU PPDU of 80 MHz is allocated.<br>When N = 4, an EHT MU PPDU of 160 MHz or 80 + 80 MHz is allocated. |
|  | Center 26-tone RU | 1 | This subfield is used only when the Bandwidth field of EHT-SIG-A field of an EHT MU PPDU is larger than 1 (if the frequency is equal to or higher than 80 MHz). This subfield indicates whether to use a 26-tone RU at the center. |
|  | CRC | 4 | CRC calculation value |
|  | Tail | 6 | Trailer bit, which is set to 0. |

TABLE 6

|  | Subfield | Bit Count | Description |
|---|---|---|---|
| User Block field | User field | N × 21 | This subfield indicates information for each user. |
|  | CRC | 4 | CRC calculation value |
|  | Tail | 6 | Trailer bit, which is set to 0. |

As shown in Table 6, in the User Block field, User field is included, and information for each user is stored. The format of User field changes depending on whether data is transmitted to a plurality of users by OFDMA or data is transmitted by MU-MIMO. Table 7 shows User field when data is transmitted by OFDMA, and Table 8 shows User field when data is transmitted by MU-MIMO.

TABLE 7

|  | Bit Position | Subfield | Bit Count | Description |
|---|---|---|---|---|
| User field | B0-B10 | STA-ID | 11 | This subfield indicates the ID of an STA or an STA group that is the receiver of the RU of an HE MU PPDU |
|  | B11-B13 | NSTS | 3 | This subfield indicates the number of Space-time streams |
|  | B14 | Tx Beam-forming | 1 | When transmission Beamforming is used, "1" is set.<br>When transmission Beamforming is not used, "0" is set. |
|  | B15-B18 | MCS | 4 | This subfield indicates the value of Modulation and Coding Scheme |
|  | B19 | DCM | 1 | This subfield indicates whether Dual Carrier Modulation is applied to the data field. |

TABLE 7-continued

| Bit Position | Subfield | Bit Count | Description |
|---|---|---|---|
| B20 | Coding | 1 | When BCC (Binary Convolutional Code) is used, "0" is set.<br>When LDPC (Low Density Parity Check) is used, "1" is set. |

TABLE 8

|  | Bit Position | Subfield | Bit Count | Description |
|---|---|---|---|---|
| User field | B0-B10 | STA-ID | 11 | This subfield indicates the ID of an STA or an STA group that is the receiver of the RU of an HE MU PPDU |
|  | B11-B14 | Spatial Configuration | 4 | This subfield indicates the number of Spatial Streams of an STA in MU-MIMO Allocation |
|  | B15-B18 | MCS | 4 | This subfield indicates the value of Modulation and Coding Scheme |
|  | B19 | HARQ | 1 | When HARQ is used, "1" is set.<br>When HARQ is not used, "0" is set. |
|  | B20 | Coding | 1 | When BCC (Binary Convolutional Code) is used, "0" is set.<br>When LDPC (Low Density Parity Check) is used, "1" is set. |

Whether to use HARQ for data transmission to users (a plurality of partner devices for the transmitting device) is set in the HARQ subfield of the User field. Note that if the HARQ subfield is provided in the User field, the HARQ subfield of the EHT-SIG-A2 may be omitted. In addition, if the HARQ subfield is provided in the EHT-SIG-A2, the HARQ subfield of the User field may be omitted. The HARQ subfield may be provided in both the EHT-SIG-A2 and the User field. For example, whether HARQ is used for data transmission to each user may be designated in the HARQ subfield of the EHT-SIG-A2, and the type of HARQ may be designated in the HARQ subfield of the User field.

In the above-described way, the communication device can activate the HARQ control unit 303 in accordance with reception of a radio frame using HARQ, and turn off the HARQ control unit 303 at a timing other than that. As a result, it is possible to suppress waste of power consumption of the communication device. Also, for example, in a communication device including a plurality of communication processing units configured to concurrently process data, a series of data transmitted using HARQ can be distributed to a first communication processing unit, and data transmitted without using HARQ can be distributed to a second communication processing unit. This makes it possible to easily process a group of data having a predetermined relationship with each other at once. At this time, the data distribution destination can quickly be distributed when decoding of a physical header is completed. It is therefore possible to efficiently execute concurrent processing of data. Note that in addition to the AP 102 and the STAs 103 to 105, which are communication devices, an information processing device (for example, a radio chip) for generating the above-described PHY preamble can also implement the present invention.

In the above-described example, a case in which the HARQ subfield is a 1-bit field representing whether HARQ is used has been described. However, the present invention is not limited to this. For example, the HARQ subfield may be prepared as a field of two or more bits, and not only a value representing whether HARQ is used but also a value representing the type of HARQ if HARQ is used may be set. Also, for example, in the above-described example, if the HARQ subfield of the EHT-SIG-A1 or EHT-SIG-A2 is set to 1, an EHT-SIG-A3 that is added as a part of the EHT-SIG-A can be included in the radio frame. For example, the EHT-SIG-A3 can include a HARQ Type subfield representing the type of HARQ to be used. The type of HARQ can be shown such that, for example, Chase Combining is represented by the HARQ Type subfield set to 0, Incremental Redundancy is represented by the HARQ Type subfield set to 1, and Partial Chase Combining is represented by the HARQ Type subfield set to 2. Note that these are merely examples, and a type and a bit may be associated in another mode. The HARQ Type subfield need not always be provided as a part of the EHT-SIG-A. For example, another signal field may be prepared between the EHT-SIG-A and the EHT-STF (or EHT-SIG-B). In this case, the HARQ Type subfield may be set in the signal field. The PHY preamble of the PPDU used in the IEEE802.11 EHT standard notifies the receiving device of the type of HARQ used for transmission of transmission data. The receiving device can switch the method of HARQ used in data reception processing in accordance with the type of HARQ used. At this time, when, for example, the PRY preamble of the PPDU is confirmed, the receiving device can activate the communication processing function in the method of HARQ to be used and turn off the communication processing function in the HARQ methods that are not used.

According to the present invention, when a communication device receives a radio frame, it is possible to quickly recognize whether HARQ is used in data transmission by the radio frame.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication device comprising:
at least one memory that stores a set of instructions; and
at least one processing circuit,
wherein the communication device is caused, by the at least one processing circuit executing the set of instructions and/or the at least one processing circuit itself operating, to perform operations comprising:
generating a physical (PHY) frame including a preamble and a data field; and
transmitting the generated PHY frame,
wherein the preamble includes a signal filed in a predetermined communication standard, a short training field in the predetermined communication standard and a long training field in the predetermined communication standard, and
the signal field in the predetermined communication standard includes a subfield in which information concerning whether Hybrid Automatic Repeat request (HARQ) is used in transmission of data included in the data field is set.

2. The communication device according to claim 1, wherein
if the PHY frame is used for multi-user communication, another signal field in the predetermined standard arranged after the signal field in the predetermined standard and before the short training in the predetermined standard is included, and
the another signal field in the predetermined standard includes a subfield in which information concerning whether HARQ is used in the transmission of the data included in the data field for each of a plurality of partner devices is set.

3. The communication device according to claim 1, wherein the subfield includes information of a type of HARQ to be used if HARQ is used in the transmission of the data included in the data field.

4. The communication device according to claim 1, wherein the subfield is a 1-bit field representing whether HARQ is used in the transmission of the data included in the data field.

5. The communication device according to claim 1, wherein if the PHY frame in which information representing that HARQ is used is set in the subfield is received, a function for executing reception using HARQ is activated.

6. The communication device according to claim 1, wherein the communication device comprises a plurality of communication processing functions,
wherein if the PHY frame in which the information representing that HARQ is used is set in the subfield is received, the PHY frame is distributed to first communication function in the plurality of communication processing functions, and if the PHY frame in which information representing that HARQ is not used is set in the subfield is received, the PHY frame is distributed to second communication function in the plurality of communication processing functions.

7. A communication device comprising:
at least one memory that stores a set of instructions; and
at least one processing circuit,
wherein the communication device is caused, by the at least one processing circuit executing the set of instructions and/or the at least one processing circuit itself operating, to perform operations comprising:
receiving a physical (PHY) frame including a preamble and a data field,
wherein the preamble includes a signal field in a predetermined communication standard, a short training field in the predetermined communication standard and a long training field in the predetermined communication standard, and
the signal field in the predetermined communication standard includes a subfield in which information concerning whether Hybrid Automatic Repeat request (HARQ) is used in transmission of data included in the data field is set.

8. An information processing device comprising:
at least one memory that stores a set of instructions; and
at least one processing circuit,
wherein the information device is caused, by the at least one processing circuit executing the set of instructions and/or the at least one processing circuit itself operating, to perform operations comprising:
generating a physical (PHY) frame including a preamble and a data field; and
transmitting the generated PHY frame,
wherein the preamble includes a signal filed in a predetermined communication standard, a short training field in the predetermined communication standard and a long training field in the predetermined communication standard, and
the signal field in the predetermined standard includes a subfield in which information concerning whether Hybrid Automatic Repeat request (HARQ) is used in transmission of data included in the data field is set.

9. A communication method executed by a communication device, comprising
generating a physical (PHY) frame including a preamble and a data field; and
transmitting the generated PHY frame,
wherein the preamble includes a signal filed in a predetermined communication standard, a short training field in the predetermined communication standard and a long training field in the predetermined communication standard, and
the signal filed in the predetermined communication standard includes a subfield in which information concerning whether Hybrid Automatic Repeat request (HARQ) is used in transmission of data included in the data field is set.

10. A communication method executed by a communication device, comprising
receiving a physical (PHY) frame including a preamble and a data field,
wherein the preamble includes a signal field in a predetermined communication standard, a short training field in the predetermined communication standard and a long training field in the predetermined communication standard, and
the signal field in the predetermined communication standard includes a subfield in which information concerning whether Hybrid Automatic Repeat request (HARQ) is used in transmission of data included in the data field is set.

11. A control method executed by an information processing device, comprising
generating a physical (PHY) frame including a preamble and a data field; and
transmitting the generated PHY frame,
wherein the preamble includes a signal filed in a predetermined communication standard, a short training field in the predetermined communication standard and a long training field in the predetermined communication standard, and
the signal field in the predetermined standard includes a subfield in which information concerning whether Hybrid Automatic Repeat request (HARQ) is used in transmission of data included in the data field is set.

12. A non-transitory computer-readable storage medium that stores an instruction, which causes a communication device to:
generate a physical (PHY) frame including a preamble and a data field; and
transmit the generated PHY frame,
wherein the preamble includes a signal filed in a predetermined communication standard, a short training field in the predetermined communication standard and a long training field in the predetermined communication standard, and
the signal field in the predetermined communication standard includes a subfield in which information concerning whether Hybrid Automatic Repeat request (HARQ) is used in transmission of data included in the data field is set.

13. A non-transitory computer-readable storage medium that stores an instruction, which causes a communication device to receive a physical (PHY) frame including a preamble and a data field,
wherein the preamble includes a signal filed in a predetermined communication standard, a short training field in the predetermined communication standard and a long training field in the predetermined communication standard, and
the signal field in the predetermined communication standard includes a subfield in which information concerning whether Hybrid Automatic Repeat request (HARQ) is used in transmission of data included in the data field is set.

14. A non-transitory computer-readable storage medium that stores an instruction, which causes an information processing device to:
generate a physical (PHY) frame including a preamble and a data field; and
transmit the generated PHY frame,
wherein the preamble includes a signal filed in a predetermined communication standard, a short training field in the predetermined communication standard and a long training field in the predetermined communication standard, and
the signal field in the predetermined communication standard includes a subfield in which information concerning whether Hybrid Automatic Repeat request (HARQ) is used in transmission of data included in the data field is set.

15. The communication device according to claim 1, wherein the preamble includes an L-STF (Legacy Short Training Field), an L-LTF (Legacy Long Training Field) and L-SIG (Legacy Signal Field).

16. The communication device according to claim 7, wherein the preamble includes an L-STF (Legacy Short Training Field), an L-LTF (Legacy Long Training Field) and L-SIG (Legacy Signal Field).

17. The information device according to claim 8, wherein the preamble includes an L-STF (Legacy Short Training Field), an L-LTF (Legacy Long Training Field) and L-SIG (Legacy Signal Field).

* * * * *